(12) United States Patent
Zbinden et al.

(10) Patent No.: US 10,247,323 B2
(45) Date of Patent: Apr. 2, 2019

(54) SHUT-OFF VALVE HOUSING AND SHUT-OFF VALVE

(71) Applicant: GEBERIT INTERNATIONAL AG, Jona (CH)

(72) Inventors: Dario Zbinden, Männedorf (CH); Silvan Wenk, Schmerikon (CH); Raphael Fassler, Jona (CH)

(73) Assignee: GEBERIT INTERNATIONAL AG, Jona (CH)

( * ) Notice: Subject to any disclaimer, the term of this patent is extended or adjusted under 35 U.S.C. 154(b) by 94 days.

(21) Appl. No.: 14/912,295

(22) PCT Filed: Aug. 8, 2014

(86) PCT No.: PCT/EP2014/067097
§ 371 (c)(1),
(2) Date: Feb. 16, 2016

(87) PCT Pub. No.: WO2015/022272
PCT Pub. Date: Feb. 19, 2015

(65) Prior Publication Data
US 2016/0201821 A1    Jul. 14, 2016

(30) Foreign Application Priority Data
Aug. 16, 2013   (EP) .................................. 13 180 687

(51) Int. Cl.
*F16K 27/02*    (2006.01)
*F16K 1/04*     (2006.01)
(Continued)

(52) U.S. Cl.
CPC ................ *F16K 27/02* (2013.01); *F16K 1/04* (2013.01); *B29C 45/006* (2013.01);
(Continued)

(58) Field of Classification Search
CPC ....... F16K 27/00; F16K 27/02; B29C 45/006; B29C 45/0062; B29C 47/0811
(Continued)

(56) References Cited

U.S. PATENT DOCUMENTS 633,324 A  * 9/1899  Luke ....................... F16L 33/24
                                                   285/148.11
8,152,030 B2 * 4/2012  Coroneos ............. B65D 83/207
                                                   137/322
(Continued)

FOREIGN PATENT DOCUMENTS

CN         102788165 A     11/2012
EP         1 098 120 A1     5/2001
(Continued)

OTHER PUBLICATIONS

International Search Report for PCT/EP2014/067097 dated Sep. 8, 2014.
(Continued)

*Primary Examiner* — Marina A Tietjen
*Assistant Examiner* — Paul J Gray
(74) *Attorney, Agent, or Firm* — Sughrue Mion, PLLC (57) ABSTRACT

A shut-off valve housing (1) for installing in a sanitary device, such as in a cistern (2), comprises a water-guiding channel (3) which is arranged in the shut-off valve housing (1) and has an inlet (4) and an outlet (5). The shut-off valve housing (1) comprises a housing element (8) made of plastic and at least one connector element (9) made of metal which is connected to the housing element (8), wherein the water-guiding channel (3) extends through the housing element (8) and through the connector element (9).

19 Claims, 4 Drawing Sheets

(51) Int. Cl.
  *B29C 47/08* (2006.01)
  *B29C 45/00* (2006.01)
  *E03D 1/32* (2006.01)
(52) U.S. Cl.
  CPC ....... *B29C 45/0062* (2013.01); *B29C 47/0811* (2013.01); *E03D 1/32* (2013.01)
(58) Field of Classification Search
  USPC .................... 251/366, 367, 368; 29/890.127
  See application file for complete search history.

(56) References Cited

U.S. PATENT DOCUMENTS

| | | | | |
|---|---|---|---|---|
| 2003/0136445 | A1* | 7/2003 | Sichler | F16L 47/34 137/318 |
| 2004/0074538 | A1* | 4/2004 | Ortenzi | B65D 90/34 137/493.4 |
| 2010/0025612 | A1* | 2/2010 | Tasi | E03C 1/0404 251/318 |

FOREIGN PATENT DOCUMENTS

| | | |
|---|---|---|
| EP | 1 816 378 A2 | 8/2007 |
| EP | 1 895 215 A2 | 3/2008 |
| ES | 247 748 A | 6/1959 |
| GB | 702 027 A | 1/1954 |
| GB | 924 710 A | 5/1963 |

OTHER PUBLICATIONS

International Preliminary Report on Patentability dated Feb. 25, 2016 from the International Bureau in counterpart International Application No. PCT/EP2014/067097.

Communication dated Feb. 4, 2017, from the State Intellectual Property Office of the P.R.C., in counterpart Chinese application No. 201480045433.7.

\* cited by examiner

SHUT-OFF VALVE HOUSING AND SHUT-OFF VALVE

CROSS-REFERENCE TO RELATED APPLICATIONS

This application is a National Stage International Application No. PCT/EP2014/067097 filed Aug. 8, 2014, claiming priority based on European Patent Application No. 13 180 687.9 filed Aug. 16, 2013, the contents of all which are incorporated herein by reference in their entirety.

TECHNICAL FIELD

The present invention relates to a shutoff valve housing for installation in sanitary devices, such as cisterns, according to the preamble of claim 1.

PRIOR ART

Shutoff valves for installation in cisterns are known from the prior art. Such shutoff valves serve to connect a water pipe situated on the building side and a filling valve.

The shut-off valves are usually made from metallic materials. Typically, a forged part is produced from a brass blank and is then reworked. Although shutoff valves of this type are easy to install for the installer, production is comparatively costly, in particular with regard to metal prices.

SUMMARY OF THE INVENTION

Based on this prior art, an object of the invention is to provide a shutoff valve which overcomes the drawbacks of the prior art. In particular, the intention is to provide a shutoff valve which for the installer is the same as before in terms of handling, but which can be produced significantly more efficiently.

This object is achieved by a shutoff valve according to the subject of claim 1. According to this, a shutoff valve housing for installation in a sanitary device, such as in a cistern, comprises a water duct which is arranged in the shutoff valve housing and has an inlet and an outlet. The shutoff valve housing comprises a housing element, made of plastic, and at least one connector element, made of metal, which latter is in connection with the housing element, wherein the water duct extends through the housing element and through the connector element. The water duct extends through the inlet connector and the outlet connector and through the housing element. The connector element serves to connect the shut-off valve housing to a water pipe.

The formation of the housing element from plastic and the connector element from metal has the advantage that the shutoff valve housing can be produced using fewer resources, without any loss of functionality and operating reliability. The metal component of such a shutoff valve is reduced. The formation of the connector element from metal has further advantages, because the installer is afforded traditional methods of connecting to the water pipe which are familiar to him. Thus the connection point between the connector element and the water pipe can be sealed, as before, by means of hemp or similar. Moreover, the formation of the connector element from metal ensures an enduring and watertight connection to the pipe system.

The connector element as well as the housing element, respectively, have a bore or opening, which provide the water duct.

In a further development, the shutoff valve housing comprises an inlet connector comprising the inlet and an outlet connector comprising the outlet. Preferably, the metallic connector element forms the inlet connector and/or the outlet connector.

In a particularly preferred embodiment, solely the inlet connector is provided by the metallic connector element, while the outlet connector and the housing element are made of plastic. The outlet connector is here part of the housing element. The formation of the inlet connector with the metallic connector element has the advantage that the shut-off valve housing can be variously connected up to a multiplicity of different water pipes on the building side.

Both the inlet connector and the outlet connector preferably comprise a thread with which the corresponding connector is connectable to a water pipe.

The water duct is delimited by a housing wall which is provided by the housing element and, where appropriate, by the connector element.

Preferably, the connector element, with a bore, constitutes an extension of the water duct and provides, moreover, a part of the housing wall of the water duct. The water thus comes into contact with the connector element, as well as with the housing element.

In an alternative embodiment, the connector element at least partially encloses the housing wall of the water duct, on its surface facing away from the water duct, with a bore. The connector element thus encloses the housing element, which for its part extends through the connector element, so that the connector element does not come into contact with the water.

The bore preferably runs centrally through the connector element.

Particularly preferably, the housing element substantially fully encloses or covers that surface of the connector element which is facing toward the water duct.

Preferably, the housing element and the connector element are integrally and/or positively connected to each other, so that a one-piece shutoff valve housing is provided.

Particularly preferably, the connector element is configured as an insert part and the housing element as an injection molded part, wherein the housing element is molded directly onto the connector element. A particularly good bond between housing element and connector element can hereby be achieved. Furthermore, this type of connection also allows an economical production.

Preferably, the connector element and the housing element respectively have a connecting portion, by which connecting portions the connector element and the housing element are in connection with each other.

In a particularly preferred embodiment, the connector element comprises an inner and an outer connecting portion, which are both in connection with corresponding connecting portions on the housing element.

Particularly preferably, the connector element is at least partially surrounded in the region of the connecting portion, both on the side facing away from the water duct and on the side facing toward the water duct, by the housing element. A particularly good connection between connector element and housing element is thus provided.

Preferably, the connector element projects in the region of the connecting portion in some sections into the housing element.

Preferably, the connector element has a functional structure, which improves or supports the connection to the housing element. In a particularly preferred embodiment, the connector element comprises on its side facing toward the water duct a functional structure, in particular in the form of circumferential grooves running radially to the water duct. Alternatively or additionally, the connector element comprises on its side facing away from the water duct a functional structure, in particular in the form of circumferential grooves running axially to the water duct.

In a further development, the connector element comprises at least two, with respect to the water duct, opposite flats, which flats are left exposed by the housing element, wherein said flats are preferably disposed in the region of the functional structure. Via the flats, the installer can grip the shutoff valve housing with a wrench or pipe wrench.

In addition, the connector element preferably has a thread by which the connector element is connectable to a water pipe.

Said flats are preferably accessible through a breackthrough in the wall of the first housing part.

Particularly preferably, the shutoff valve housing is configured as an angle valve housing, wherein the water duct has a deflection region, and wherein the inlet connector runs at an angle to the outlet connector. The angle between the inlet connector and the outlet connector preferably amounts to 90°.

Preferably, in the water duct is arranged at least one valve seat for the cooperation of a valve tappet and in the housing element is arranged at least one receiving portion for receiving the valve tappet, wherein the receiving portion is preferably a thread. The receiving portion opens out into the water duct.

Preferably, the housing element and/or the connector element comprise a positioning portion for the positioning of the shutoff valve housing in a cistern.

Preferably, the housing element and/or the connector element have a fastening portion, via which the shutoff valve housing is fastenable with a fastening element to a cistern.

Particularly preferably, the volume share of the metallic components on the shutoff valve is smaller than the volume share of the plastic components. In a particularly preferred embodiment, the volume share of the metallic components is substantially smaller than the volume share of the plastic components.

A shutoff valve, in particular an angle valve, comprises a shutoff valve housing according to the above description, wherein a valve tappet is arranged in the water duct.

Further embodiments are defined in the dependent claims.

BRIEF DESCRIPTION OF THE DRAWINGS

Preferred embodiments of the invention are described below with reference to the drawings, which serve merely for illustration and should not be interpreted as restrictive. In the drawings.

DESCRIPTION OF PREFERRED EMBODIMENTS

Figure 1:
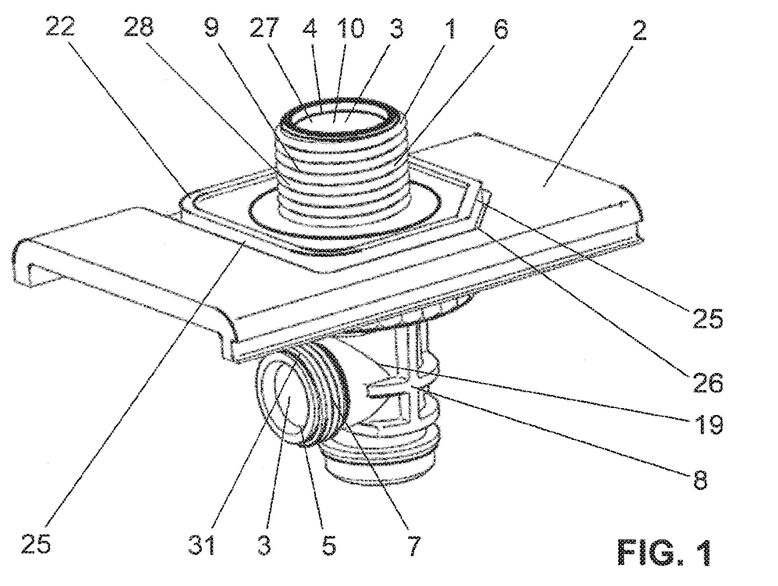
FIG. 1 shows a perspective view of a first embodiment of a shutoff valve housing with schematically depicted cistern, from above.
Figure 2:
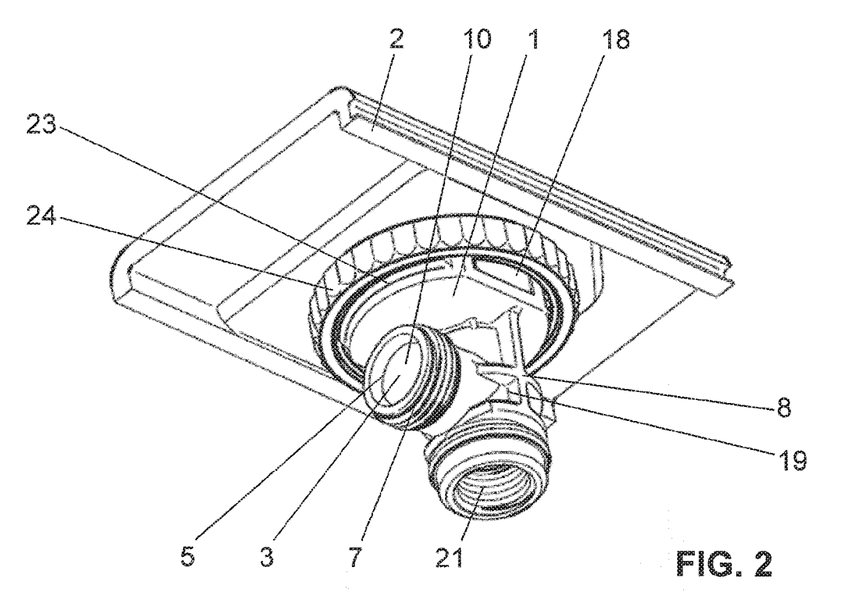
FIG. 2 shows a perspective view of the shutoff valve housing according to FIG. 1, from below.

In FIGS. 1 and 2, a perspective view of an embodiment of a shutoff valve housing 1 according to the invention is shown. The shutoff valve housing 1 is here installed in a partially depicted cistern 2. The shutoff valve housing 1 is thus suitable for installation in a sanitary device. In particular in case of installation in a cistern, the shutoff valve housing 1 is preferably configured as an angle valve housing.

The shutoff valve housing 1 comprises a water duct 3, which is arranged in the shutoff valve housing 1 and has an inlet 4 and an outlet 5. Via the inlet 4 water can be fed to the water duct 3, and via the outlet 5 the water leaves the water duct 3 again. The shutoff valve housing 1 further comprises an inlet connector 6, comprising the inlet 4, and an outlet connector 7, comprising the outlet 5. Via the inlet connector 6 or the outlet connector 7, respectively, the shutoff valve housing 1 can be connected up to a water pipe. The water pipe, which is in connection with the inlet connector 6, is generally part of a pipe system in a building. If the shutoff valve housing is employed in a cistern, the water pipe which is in connection with the outlet connector 7 leads to a filling valve. For this, a hose, in particular an armored hose, is generally used.

The shutoff valve housing 1 comprises a housing element 8, made of plastic, and at least one a connector element 9, made of metal, which latter is in connection with the housing element 8. The water duct 3 extends through the housing element 8 and through the connector element 9. The connector element 9 provides the inlet connector 6 having the inlet 4 and/or the outlet connector 7 having the outlet 5. The connector element 9, and also the housing element 8, respectively, comprise a bore or opening, which bore or opening provide the water duct 3.

In a particularly preferred embodiment, solely the inlet connector 6 is provided by the metallic connector element 9. The outlet connector 7 is then part of the housing element 8. In other words: the outlet connector 7 and the rest of the shutoff valve housing 1 are then formed of plastic.

In the present embodiment, the housing element 8 comprises a positioning portion 22 for the positioning of the shutoff valve housing in a cistern 2. The positioning portion 22 is here configured as a circumferential flange and comprises positioning surfaces 25. These positioning surfaces 25 are in contact with corresponding surfaces 26 on the cistern. The positioning surfaces 25 are configured asymmetrically, so that the shutoff valve housing can be installed in the cistern 2 only in a predetermined position. The positioning portion 22 can also however be arranged on the connector element 9, or on the housing element 8 and on the connector element 9.

In the present embodiment, the housing element 8 further comprises a fastening portion 23. This fastening portion 23 can be clearly recognized in FIG. 2. The fastening portion 23 cooperates with a fastening element 24. Via the fastening element 24, which here is in the shape of a ring nut, the shutoff valve housing 1 can be clamped to the cistern 2. The fastening portion 23 preferably has the form of a thread.

Figure 3:
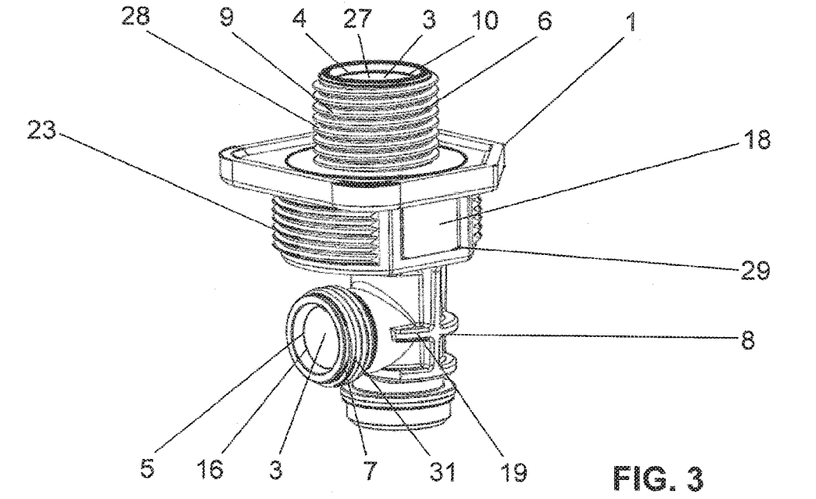
FIG. 3 shows a perspective view of the shutoff valve housing according to FIGS. 1 and 2, without cistern.
Figure 4A:
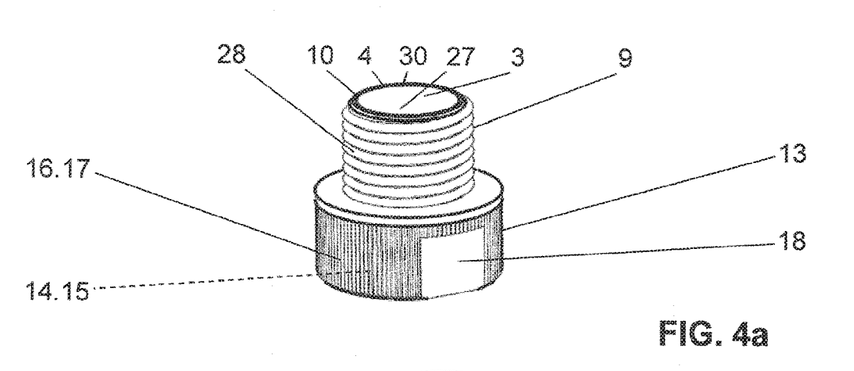
FIG. 4a and FIG. 4b show an exploded view of the shutoff valve housing according to the preceding figures, wherein the connector element is depicted separately from the housing element.
Figure 4B:
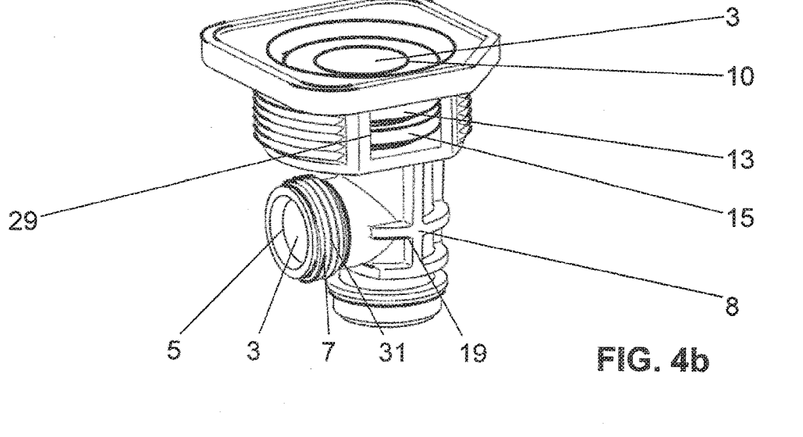

In FIG. 3, the shutoff valve housing 1 is shown without the cistern 2. FIGS. 4a and 4b show an exploded view of the shutoff valve housing 1, wherein the housing element 8 and the connector element 9 are depicted separately from each other.

In FIG. 4a, the preferred connector element 9 is shown. The connector element 9 is made of metal. Particularly preferably, the connector element 9 is made from brass. This is constituted, for instance, by a forged part, which, following the forging, is machine cut or worked using some other forming method.

In FIG. 4b, the housing element 8 is shown in isolation, i.e. separate from the connector element 9. The housing element 8 is made of plastic, in particular of a thermoplastic.

The housing element 8 and the connector element 9 are integrally and/or positively connected to each other. Thus a one-piece shutoff valve housing 1 comprising or consisting of the housing element 8 and the connector element 9 is thus provided. The connector element 9 is preferably configured as an insert part and the housing element 8 as an injection molded part. The housing element 8 is molded onto the connector element 9 in an injection molding process.

In FIGS. 4a and 4b, the separation between connector element 9 and housing element 8 in terms of their material can be recognized particularly clearly. In the particularly preferred embodiment, the connector element 9 provides the inlet connector 6. The outlet connector 7 and the housing element 8 form a single part, which is made from plastic. Consequently, in the particularly preferred embodiment, solely or only the inlet connector 6 is thus made from metal, while the rest of the housing is made of plastic.

Figure 5:
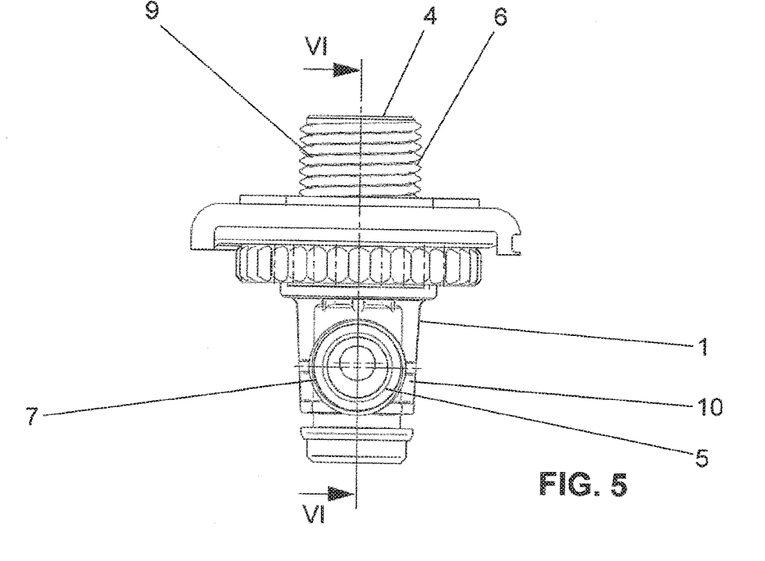
FIG. 5 shows a side view of the shutoff valve housing according to the preceding figures.
Figure 6:
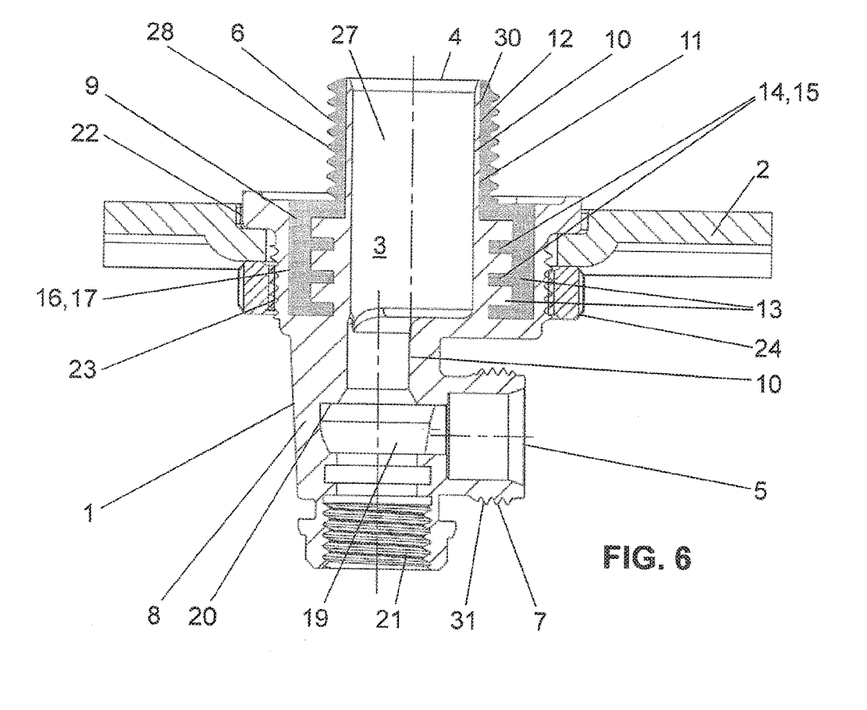
FIG. 6 shows a sectional view along the sectional line VI-VI of FIG. 5 with shaded connector element according to one variant.

In FIG. 6, a sectional view along the sectional line VI-VI of FIG. 5 is shown. Here a variant of the configuration of the shutoff valve housing in the region of the inlet connector is shown. According to this variant, the connector element 9 encloses the housing wall 10 of the water duct 3 on the housing wall surface 11 facing away from the water duct 3. In other words, parts of the housing element 8 extend through the connector element 9 or the connector element 9 partially surrounds the housing element 8, respectively. That surface of the connector element 9 which is facing toward the water duct 3 is thus covered by the housing element 8. The water duct 3 is thus provided solely by parts of the plastic housing element 8, yet the water duct 3 still extends through the connector element 9. This has the advantage that the water does not come into contact with metal, but rather is solely in contact with plastic.

Figure 7:
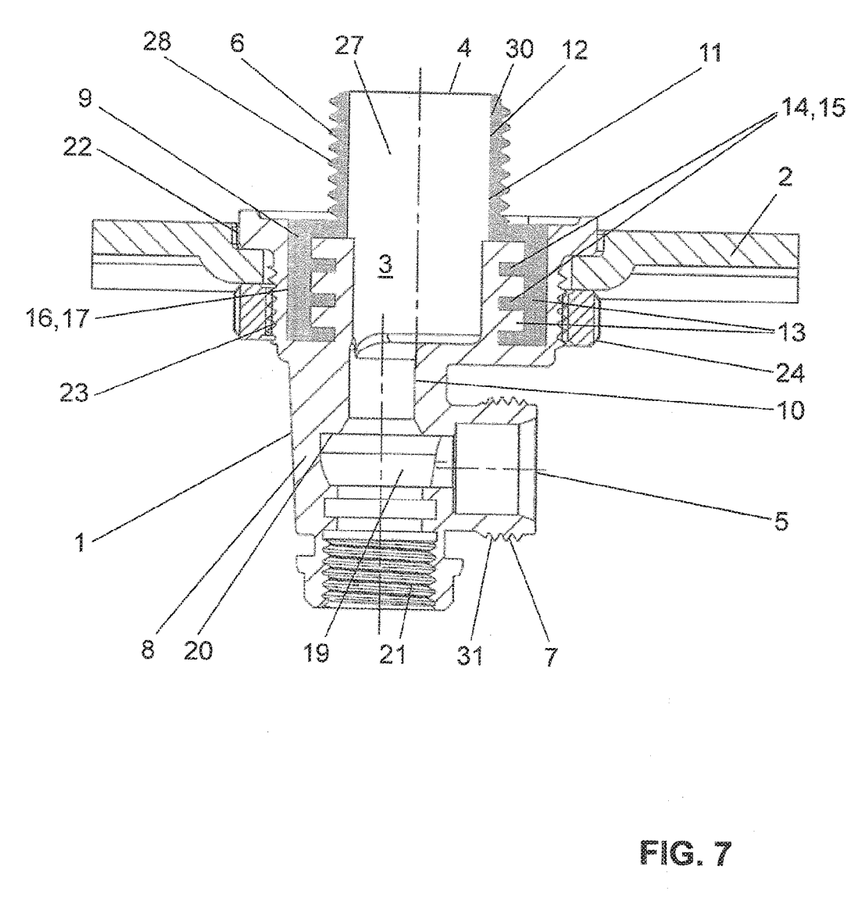
FIG. 7 shows a sectional view along the sectional line VI-VI of FIG. 5 with shaded connector element according to a further variant.

In FIG. 7, a sectional view along the sectional line VI-VI of FIG. 5 is shown. Here a further variant of the configuration of the shutoff valve housing in the region of the inlet connector is shown. According to this variant, the connector element 8 constitutes an extension of the water duct 3 outside the housing element 9. The connector element provides a part of the housing wall 10 of the water duct 3. In this embodiment, the water duct is composed of parts of the housing element 8 and of the connector element 9.

From the sectional views of FIGS. 6 and 7 and the exploded view of FIGS. 4a and 4b, it can be recognized that the connector element 9 and the housing element 8 respectively have a connecting portion 13. Via the connecting portions 13, the connector element 9 and the housing element 8 are in connection with each other.

In a particularly preferred embodiment, the connector element 9 comprises an inner and an outer connecting portion 13. Via these two connecting portions 13, the connector element 9 is in connection with the housing element 8. The connector element 8 is thus surrounded in the region of these connecting portions by the housing element 8.

The connector element 9 projects in the region of the connecting portion 13 in some sections into the housing element 8 and is surrounded in these sections by the housing element 8.

The connector element 9 has on its side facing toward the water duct 3, in the region of the connecting portion 13, a functional structure 14. The functional structure 14 is here in the shape of circumferential grooves 15 running radially to the water duct 3. Here, three grooves 15 are arranged. Less than or more than three grooves can also be arranged.

Additionally or alternatively to the inner functional structure, the connector element 9 has on its side facing away from the water duct 3, in the region of the connecting portions 13, a functional structure 16. The functional structure 16, which is arranged on the side facing away from the water duct 3, comprises a multiplicity of grooves 17 running axially to the water duct.

The functional structures 14 and 16 improve the connection of the connecting portions 13 to the housing element 8.

As can be recognized in FIG. 3, and FIGS. 4a and 4b, respectively, the connector element 9 comprises at least two, with respect to the water duct 3, opposite flats 18. Via these flats 18, the installer can grip the shutoff valve housing 1 with a wrench or pipe wrench. The flats 18 are part of the connector element 9 and are thus made of metal. That is to say, in the assembly of the shutoff valve housing, the high forces are applied via the metallic parts. The plastic elements are not subjected to load.

As is depicted in FIG. 3, the flats 18 are left exposed by the housing element 8. The housing element 8 comprises in the region of the flats 18 corresponding recesses 29. As a result of these recesses 29, the flat 18 protrudes out of the housing element 8. Particularly preferably, the flats 18 are arranged in the region of the functional structure 16, i.e. of the grooves 17 running in axial direction. A different arrangement is also conceivable.

With reference to FIG. 4a, the connector element 9 is described in detail. As already mentioned, the connector element 9 comprises a bore 27, which extends through the connector element 9. The bore 27 is delimited by a wall 30. On the outer side, the connector element 9 comprises an external thread 28. Via this external thread 28, the connector element 9 can be connected to a water pipe. The external thread 28 is then adjoined in the axial direction by the connecting portion 13 having the characteristics described above. The diameter of the connecting portion 13 is here greater than the diameter of the thread 28. The bore 27 provides or constitutes a part of the water duct, respectively. The bore 27 can preferably be covered by the housing element 8 or remain exposed.

The outlet connector 7 comprises an external thread 31, via which a hose can be connected.

Particularly preferably, the shutoff valve housing 1 is configured as an angle valve. The water duct 3 here has a deflection region 19. The deflection region 19 is depicted correspondingly in FIGS. 6 and 7. Thus the inlet connector 6 runs at an angle to the outlet connector 7.

In the water duct 3 is arranged at least one valve seat 20 for the cooperation of a valve tappet (not depicted in the figures). The valve seat 20 can be variously configured, but preferably the valve seat 20 is part of the housing element 8.

In addition, the housing element 8 comprises a receiving portion 21 for receiving the valve tappet. In the present embodiment, the receiving portion 21 has the form of a thread. Via this thread, the valve tappet is moved toward the valve seat 20 or moved away from the valve seat 20, respectively.

According to a method for producing the shutoff valve housing described herein, in a first step the metal connector element 9 is placed in an injection mold. In a second step following this first step, the plastic housing element 8 is molded onto the connector element 9.

REFERENCE SYMBOL LIST 1 shutoff valve housing
2 cistern
3 water duct
4 inlet
5 outlet
6 inlet connector
7 outlet connector
8 housing element
9 connector element
10 housing wall
11 outer wall
12 surface
13 connecting portion
14 functional structure
15 groove
16 functional structure
17 groove
18 flats
19 deflection region
20 valve seat
21 receiving portion
22 positioning portion
23 fastening portion
24 fastening element
25 positioning surface
26 surfaces
27 bore/opening
28 external thread
29 recess
30 wall
31 external thread

The invention claimed is:
1. A shutoff valve housing for installation in a sanitary device comprising
a water duct, which is arranged in the shutoff valve housing and has an inlet and an outlet,
wherein the shutoff valve housing comprises a housing element, made of plastic, and at least one connector element, made of metal, the at least one connector element being in connection with the housing element, wherein the water duct extends through the housing element and through the connector element,
wherein the connector element is configured as an insert part and the housing element as an injection molded part,
wherein the housing element is molded onto the connector element such that a one-piece shutoff valve housing is provided,
wherein the connector element comprises at least two, with respect to the water duct, opposite flats, which flats are part of the connector element and are made of metal, and
wherein the housing element comprises in the region of the flats corresponding recesses through which the flats are accessible.

2. The shutoff valve housing as claimed in claim 1, wherein the shutoff valve housing comprises an inlet connector comprising the inlet, and an outlet connector comprising the outlet, and
wherein the connector element comprises the inlet connector or the outlet connector.

3. The shutoff valve housing as claimed in claim 1, wherein the shutoff valve housing comprises an inlet connector comprising the inlet, and an outlet connector comprising the outlet, wherein solely the inlet connector comprises the metallic connector element, while the outlet connector and the housing element are made of plastic.

4. The shutoff valve housing as claimed in claim 1, wherein the connector element, with a bore or opening, constitutes an extension of the water duct and a part of the housing wall of the water duct.

5. The shutoff valve housing as claimed in claim 1, wherein the connector element at least partially encloses a housing wall of the water duct with a bore on a surface of the connector element facing away from the water duct.

6. The shutoff valve housing as claimed in claim 5, wherein the housing element fully covers the surface of the connector element which is facing toward the water duct.

7. The shutoff valve housing as claimed in claim 1, wherein the housing element and the connector element are integrally and/or positively connected to each other, forming a one-piece shutoff valve housing.

8. The shutoff valve housing as claimed in claim 1, wherein the connector element and the housing element, respectively, comprise at least one connecting portion, by which at least one of the connecting portion, the connector element, and the housing element are in connection with each other.

9. The shutoff valve housing as claimed in claim 8, wherein the connector element is at least partially surrounded in a region of the connecting portion, both on a side facing away from the water duct and on a side facing toward the water duct, by the housing element.

10. The shutoff valve housing as claimed in claim 1, wherein the connector element projects in a region of the connecting portion into the housing element.

11. The shutoff valve housing as claimed in claim 1, wherein the connector element comprises on a side facing toward the water duct a functional structure in the form of circumferential grooves running radially to the water duct, which functional structure improves the connection to the housing element, and/or wherein the connector element comprises on a side facing away from the water duct a functional structure in the form of circumferential grooves running axially to the water duct, which functional structure improves the connection to the housing element.

12. The shutoff valve housing as claimed in claim 11, wherein said flats are arranged in the region of the functional structure.

13. The shutoff valve housing as claimed in claim 1, wherein the shutoff valve housing is configured as an angle valve housing,
wherein the water duct has a deflection region, and
wherein the inlet connector runs at an angle to the outlet connector.

14. The shutoff valve housing as claimed in claim 1, wherein in the water duct is arranged at least one valve seat for the cooperation of a valve tappet, and
wherein in the housing element is arranged at least one receiving portion for receiving the valve tappet.

15. The shutoff valve housing as claimed claim 1, wherein the housing element and/or the connector element comprises a positioning portion for the positioning of the shutoff valve housing in a cistern, and/or wherein the housing element and/or the connector element comprises a fastening portion, via which the shutoff valve housing is fastenable with a fastening element to a cistern, and/or wherein the connector element comprises on the outer side a thread.

16. A shutoff valve, in particular an angle valve, comprising a shutoff valve housing as claimed in claim 1, wherein a valve tappet is arranged in the water duct.

17. A cistern arrangement comprising a cistern having a receptacle for the fastening of a shutoff valve as claimed in claim 16.

18. A method for producing a shutoff valve housing as claimed in claim 1, wherein the metal connector element is placed in an injection mold, and wherein the plastic housing element is subsequently molded onto the connector element.

19. The shutoff valve housing as claimed in claim 14, wherein the receiving portion is a thread.

* * * * *